Figure 1:
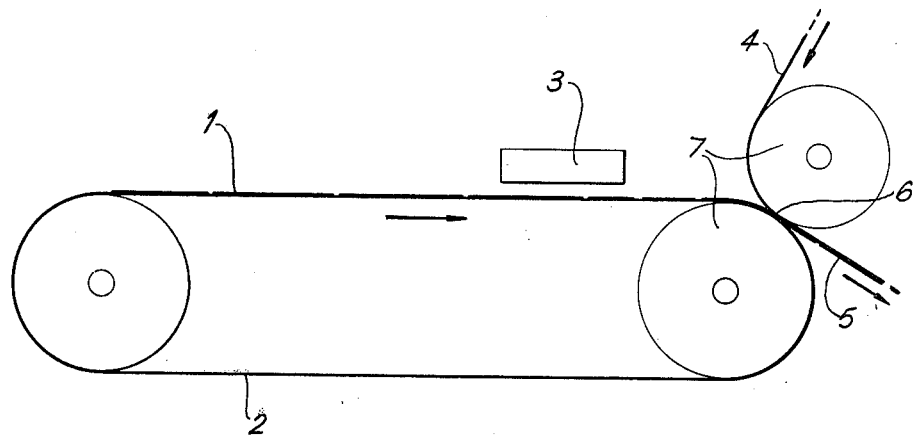

United States Patent [19]

Brewer et al.

[11] 4,122,224

[45] Oct. 24, 1978

[54] WALL AND FLOOR COVERINGS

[75] Inventors: Douglas M. Brewer, Broughty Ferry; Alan Mawson, Leslie; William S. Carter, Kirkcaldy, all of Scotland

[73] Assignee: Nairn Floors Limited, Lune Mills, England

[21] Appl. No.: 761,195

[22] Filed: Jan. 21, 1977

Related U.S. Application Data

[63] Continuation-in-part of Ser. No. 639,519, Dec. 10, 1975, abandoned.

[30] Foreign Application Priority Data

Dec. 12, 1974 [GB] United Kingdom ............... 53709/74

[51] Int. Cl.² .......................... B32B 5/16; B32B 5/18
[52] U.S. Cl. ..................... 428/159; 428/142; 428/306; 428/320; 428/327
[58] Field of Search ........................ 428/46, 47, 48, 85, 428/95, 158, 159, 160, 161, 142, 327, 323, 96, 310, 315, 305, 234, 306, 235, 300, 320, 321

[56] References Cited

U.S. PATENT DOCUMENTS

| 3,038,828 | 6/1962 | Yakubik | 428/161 |
|---|---|---|---|
| 3,150,032 | 9/1964 | Rubenstein | 428/322 |
| 3,213,071 | 10/1965 | Campbell | 428/315 |
| 3,360,422 | 12/1967 | Desch | 428/315 |
| 3,451,885 | 6/1969 | Klein | 428/234 |
| 3,501,370 | 3/1970 | Juredine | 428/315 |
| 3,616,029 | 10/1971 | Lerman | 428/315 |
| 3,684,630 | 8/1972 | Sensenig et al. | 428/159 |
| 3,871,897 | 3/1975 | Ealding | 260/2.5 HA |
| 3,931,429 | 1/1976 | Austin | 428/158 |
| 3,956,783 | 5/1976 | Stoller | 428/300 |
| 3,975,562 | 8/1976 | Madebach et al. | 428/315 |
| 3,982,051 | 9/1976 | Taft et al. | 428/95 |
| 3,985,925 | 10/1976 | Lefebvre et al. | 428/95 |

*Primary Examiner*—William J. Van Balen
*Attorney, Agent, or Firm*—Lawrence Rosen; E. Janet Berry

[57] ABSTRACT

Floor or wall covering is provided and comprises a decorative opaque surface layer bonded to a sheet backing which is either rejected decorative cushioned vinyl wall or floor covering or is a sheet obtained by comminuting and softening such wall or floor covering and forming the resultant mass into a sheet.

9 Claims, 2 Drawing Figures

WALL AND FLOOR COVERINGS

This application is a continuation-in-part of our copending application Ser. No. 639,519, filed Dec. 10, 1975, now abandoned. This invention relates to floor coverings and heavy wall coverings, i.e wall coverings of the type that resemble floor coverings. Such materials need, inter alia, wear resistance, a decorative appearance, bulk, and dimensional stability. The first two of these properties can be provided, in theory, by a relatively thin, wear resistant and decorative layer. However, to provide the bulk and dimensional stability necessary in floor coverings and heavy wall coverings this layer has to be integral with a sufficiently bulky body or has to be bonded to a separate backing. For example, whilst a thin, e.g. 2 mm thick, needled web provides in theory most of the decorative and wear resistant properties of a needled carpet, it cannot be used by itself due to inadequate bulk and dimensional stability. Therefore it either has to be bonded to a separate backing or the web has to be made much thicker, e.g. 8 mm. Similarly, a single ply of an opaque decorative calendered vinyl sheet is not usable by itself as a floor covering, but is usable if it is backed by, for example, laminating two or more such plies together.

Naturally the provision of bulk by the use of material of substantially the same quality as the surface layer is more expensive than the provision of bulk by a backing formed of material designed specifically for this purpose.

Various types of backing for opaque decorative floor or wall covering surface layers are known. For example, in one a liquid foamable rubber latex composition is foamed, applied to the back of the surface layer, and cured. In another, a preformed layer of foam is bonded to the back of the layer. In another, a felt of waste or regenerated fibres is formed and is bonded to the back of the layer. Although the backing is generally formed of material that is cheaper than the surface layer, the provision of the backing still constitutes a significant proportion of the total cost of the final product.

Cushioned vinyl floor coverings are now made on a very large scale. They comprise a foamed layer which generally contains reinforcing fibres or is carried on a support such as an asbestos or cellulosic felt, a continuous vinyl layer on top of the foamed layer, and often a wear resistant layer over the continuous layer. The cushioned floor covering generally has a printed decorative pattern, and may also have an embossed pattern. Embossed cushioned floor coverings may be made by various processes, such as by printing different vinyl compositions and foaming some or all of them, or by forming a sheet of a single composition and printing onto the sheet a material that will cause differential degrees of foaming. This material is often included in a pigmented composition. Suitable products are sold under various trade names, including the Trade Mark "Cushionflor", and processes of making them are described in various patent specifications, including British Patent Specifications Nos. 1,069,998; 1,147,983; and 1,150,902; and U.S. Pat. No. 2,920,977.

The printed decorative pattern is usually a multi-colour complex pattern that in practice is applied in two or more different printing operations. As a result there is a considerable risk of parts of the pattern being out of register with each other. Accordingly it is standard in the manufacture of cushioned vinyl floor coverings to inspect the final decorative product and to reject all inferior quality material, usually because of faults arising solely in the appearance of the decorative layer. Depending upon the standards applied some of the "rejected" material may be usable as floor covering in some situations, but some at least of it will be wholly unsaleable. With products formed of a homogeneous composition, for example non-foamed floor coverings consisting solely of vinyl materials, it is relatively easy to melt the product down and re-cycle it as feedstock for the floor covering. However this cannot be done in practice with cushioned vinyl floor coverings because of the components in such materials, and at present no real use has been devised for rejected decorative cushioned vinyl wall and floor coverings. Accordingly at present relatively large volumes of inferior quality material are being destroyed or dumped every day, and the economics of the production of such materials are traditionally calculated to allow for this wastage, which over many years has been accepted as necessary.

A floor or heavy wall covering according to the invention comprises a decorative opaque surface layer bonded to a sheet backing which is either rejected decorative cushioned vinyl wall or floor covering or is sheet obtained by comminuting and softening such a wall or floor covering and forming the resultant mass into a sheet. Thus in the invention decorative cushioned i.e. foamed vinyl wall or floor covering is made and is then inspected, inferior quality material is rejected and an opaque surface layer is bonded either to the rejected material or to a sheet formed from a mass obtained by comminuting and softening the rejected material. Thus in the invention we carry the production of floor or wall covering material having a decorative surface through to the end of the process and we then inspect it and use rejected material in place of conventional specially made foamed or fibrous backing materials in a backed floor or wall covering. The rejected material that we use is often of a character such that it would previously have been dumped or destroyed so that the manufacturer will have costed his process in such a way that this rejected material has no value to him. Accordingly the manufacturer uses this material which involves no extra cost to him as backing instead of having to buy in backing material, or material from which backing material can be made. Thus by combining the two processes, i.e. the production of the initial cushioned vinyl floor or wall covering material having a decorative surface with the production of a backed floor or wall covering having an opaque decorative surface, he is able to achieve large economies.

The products of the present invention generally have a thickness of from 1.5 to 15 mm, preferably 2 to 10 mm, e.g. about 3.5 mm. Suitable weights are from 800 to 3000 gm/m$^2$, preferably 1000 to 2500 gm/m$^2$, e.g. about 2000 gm/m$^2$. Generally at least half, and preferably at least two-thirds of the total weight of the product is the backing, the remainder of the weight being the decorative surface layer and any adhesive used for bonding the surface layer to the backing. The weight of adhesive is usually less than 200 gm/m$^2$. The backing is usually from 1 to 4 mm thick.

The simplest way of operating the invention is to bond the desired decorative opaque surface layer to the rejected cushioned vinyl material, in which event it is preferred that this material would have been rejected solely for defects in its surface appearance, since of course if it was rejected because there was a hole through it then it would not be usable as a backing.

The reject material can be in very short lengths, for example having the size of tiles, but preferably is in lengths greater than, say, 5 meters, and preferably greater than 10 meters. In practice the length of reject pieces is not usually above 30 meters, although it can be. The reject lengths can be joined together. Floor or wall coverings made using lengths of reject material can subsequently be cut into tiles or slit into various widths.

Instead of bonding the decorative surface layer to the rejected material the material may be converted into a mass and reformed into a sheet. Because of the asbestos or other fibrous reinforcement that is generally present in the material it is not possible simply to melt it and instead comminution is necessary. For instance it may be chopped in one or more stages to pieces having an average dimension of between 3 and 10 mm.

In practice it is necessary to soften the mass, usually by heating and mechanical working and generally after comminution, both so as to facilitate subsequent formation of the mass into a sheet and to help eliminate blowing agent that may remain in it. The softened comminuted mass may be formed into a sheet in any convenient manner, for example by extrusion or by use of calender rolls. The resultant sheet, if made form reject cushioned vinyl products containing fibrous felts, will inevitably tend to have a rather rough and variable surface because of the difficulty of dispersing the fibre uniformly within the highly viscous softened mass prior to sheet formation. If the decorative opaque surface layer is incapable of concealing this roughness then it may be desirable to apply a layer of higher quality material, for instance consisting solely of vinyl chloride polymer, over the sheet material before application of the decorative opaque surface layer. Another way of improving the characteristics of the layer is to include additional polymeric material in the mass before the sheet is formed from it, so as to dilute the effect of the fibres.

The opaque decorative surface layer may be any material conventional for floor or wall coverings that need a backing. For instance it can be an opaque plastics floor or wall covering surface layer, for instance a decorative pigmented vinyl material.

Preferably, however, the opaque decorative surface layer is fibrous, and most preferably it is non-woven, for example being a tufted or flocked product or, most preferably, a needled fibrous product. Examples are needled webs that have a smooth finish or a patterned or other textured surface finish, for example a pile or a ribbed finish. Naturally if the final product is to be used as a floor covering then the fibrous layer must have properties suitable for use as a floor covering. If the product is to be used as a wall covering then the fibrous layer may be made appropriately. Fibres in the layer may be held in position in any convenient manner. For example they may be needled, and/or they may be bonded by impregnation or by fibre fusion, preferably being multicomponent fibres that are fused to one another.

The use of fibrous surface layers, and in particular needled products, is particularly advantageous as they tend to conceal imperfections in the backing material. The fibrous layers generally are 1 to 10, e.g. 1 to 5, mm thick and generally weigh from 100 to 1000, e.g. 100 to 500, gm/m$^2$ before application to the backing.

Bonding of the surface layer to the backing can be achieved by fusion and/or by use of an adhesive, for instance a hot melt adhesive. Generally the top surface of the backing layer is fused or has adhesive applied to it, and the surface layer is then pressed onto it. For instance, the backing layer may be passed underneath an adhesive applicator and/or under suitable heaters prior to having the surface layer pressed onto it. Where heating is used it is preferably flash heating that melts the surface without melting or softening unduly the remainder of the backing material. Softening of the surface during bonding is advantageous as it tends to make the surface smoother. For instance the embossed pattern in an embossed cushioned vinyl may be lost during bonding either by filling it with adhesive or by fusion of the surface.

Suitable adhesives are hot melt adhesives, such as the material supplied by Samuel Johnson & Company under the name 12/66, and mixtures of PVC and plasticiser. Preferred adhesives are plastisols containing from 50 to 80% vinyl chloride resin and 50 to 20% plasticiser with minor amounts of stabiliser. The resin can be a vinyl chloride homopolymer or a copolymer containing, for instance, vinyl acetate. Any of the conventional plasticisers can be used, for instance butyl benzyl phthalate, diisooctyl phthalate or dialphanol phthalate. The amount of adhesive used preferably is from 65 to 350 grams per square meter, with 200 gm/m$^2$ generally being the maximum. At values above this, and in particular above 350 g., there is increasing difficulty in fusing the adhesive layer completely while with values below 65 g. there tends to be insufficient adhesive to give proper bonding, particularly if the backing is embossed or not smooth and/or if the surface layer is a textile. Best results are generally obtained with from 100 to 170 g. of hot melt adhesive per square meter.

The products of the invention are preferably made by a continuous process. Two types of suitable apparatus are illustrated diagramatically in the accompanying drawings. In FIG. 1 pieces 1 of reject material that is to serve as backing are placed on a conveyor 2, are made to abut one another so far as is conveniently possible and are carried by the conveyor under a heater or adhesive applicator shown diagramatically at 3. For instance it may be a top heater, for instance an infra-red heater, or it may be a cold adhesive applicator, but preferably it comprises apparatus for melt coating of a hot melt adhesive, for instance a set of heated rolls.

Opaque decorative material 4 that is to serve as the surface layer of the final floor or wall covering 5 is pressed onto the softened surface or the layer of adhesive at the nip 6 pressing rolls 7. In this process the pieces may be separate from one another or, preferably, are jointed to one another, for example by paper or masking tape that sticks to them and bridges the gap between them.

Figure 2:
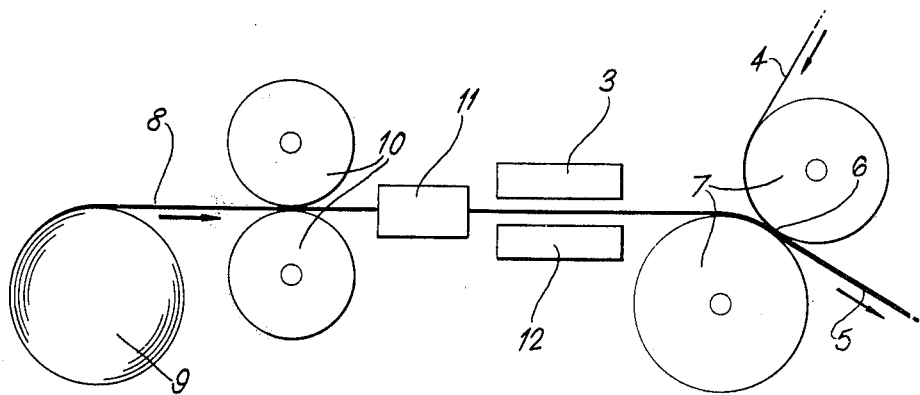

In FIG. 2 there is no conveyor and the pieces are jointed to one another as described above. Thus a continuous length 8 of jointed pieces is unwound from a reel 9, is passed through guide rolls 10, through an adhesive applicator 11, and then under a heater 3 over a cold table 12 (which is an optional feature) to the nip 6, where it is bonded to the opaque layer 4 to form a final product 5 as described above.

The product 5 may be cut in positions corresponding to the joints between adjacent pieces 1 or joints may be left in the priduct. If pieces 1 were long enough then the product 5 may be put into roll form and sold as sheet material. Alternatively, however, it may be cut into tiles, and this is preferably if the pieces 1 are short since each piece of product 5 preferably has a single, unjoined, backing. The following are some examples of the invention.

EXAMPLE 1

A web of 40% polyester and 60% bi-component nylon fibres is formed and is then needled in conventional manner for making a needled carpet. It is then heated to 225° C to achieve fusion of the outer component of the bi-component fibres and bonding of the needled web. This product weighs 400 g/m$^2$ and has a gauge of 2.5 mm. Thus it is too thin and insubstantial to use as a floor covering and must be backed.

In a separate operation a cushioned vinyl floor covering is carried on an asbestos felt is made by the general method described in, for example, British Patent Specification No. 1,069,998. Thus a foamable resinous composition is applied over the felt and is formed into a sheet without foaming of the composition, a pattern of a printing ink containing material that will alter the rate of foaming upon heating is applied, a thin transparent wear resistant layer is then applied and the resultant product heated in an oven to cause foaming and curing. The final product has an average thickness of 1.7 mm., a plasticised polyvinyl chloride weight of about 565 grams per square meter and an asbestos felt weight of 654 grams per square meter. As the resultant sheet material is led out of the oven it is inspected visually and lengths generally of from 10 to 30 meters that are seen to have an inferior surface pattern are cut out. These lengths are laid close to one another on the conveyor 2 shown in the illustrated apparatus and are led under a gas fired infra-red heater which results in the top of the material becoming very soft while the underlying vinyl composition is, at the most, softened.

The needled web is laminated onto the softened surface with a pressure of 36 kg/cm. of width and after cooling the product is cut into tiles of conventional size for use as a floor covering. The gauge of the final product is 3.5 mm. and the weight about 1600 g/m$^2$. Thus by utilising the scrap foamed vinyl as backing for the thin and insubstantial needled web one has obtained an entirely different fibrous product which is very satisfactory for use as a floor covering.

EXAMPLE 2

The process of Example 1 may be repeated using adhesive bonding instead of fusion. Thus instead of bonding solely by fusion an adhesive may be used. A suitable adhesive for bonding to vinyl materials is a vinyl chloride copolymer plastisol. For example equal parts of a 5% vinyl acetate/95% vinyl chloride copolymer (emulsion grade) and butyl benzyl phthalate may be cold mixed together to form a plastisol and then applied at 140 gm/m$^2$ by a knife on roller coater. After applying the adhesive the coated material may be passed beneath a heater which fuses the plastisol and pressed while hot to the needled web.

EXAMPLE 3

A web of 40% polyester and 60% nylon fibres is formed and then needled into a fleece with a ribbed or cordlike texture, weighing 200 g/m$^2$. The fleece is then bonded by impregnation with Acronal 380D (an acrylic latex available from BASF) adjusted to a total solids content of 20% and dried at 160° C. The product, at this stage, although of an attractive appearance, is difficult to fix to walls because of its lack of strength and thinness.

The needled, impregnated fleece is laminated onto cushioned vinyl floor covering which would normally be discarded because of an inferior surface decoration, as described in Example 1. The material so produced had good strength and could easily be adhered to walls.

EXAMPLE 4

Previously rejected cushioned vinyl floor covering is re-constituted into sheet form suitable for use as a backing for opaque decorative surface layers, by mixing the roughly chopped material in a Baker Perkins mixer and milling the hot composition and forming it into a sheet at 150° C on a two-roll mill. The sheet so produced is approximately 1.5 mm thick and quite cohesive but possesses a rough, uneven surface containing particles of imperfectly dispersed material arising from the backing of the cushioned vinyl floor covering. Without extensive use of levelling compositions the backing so produced is not sufficiently smooth to be used as a substrate on which to coat foamable plastisol.

The re-constituted sheet so formed is coated at 190 gm/m$^2$ with an adhesive comprising a plastisol produced from 100 parts of Corvic XP60/68 (a vinyl chloride copolymer available from I.C.I.) and 80 parts of Pliobrac LTP (a plasticiser available from Albright & Wilson Ltd.) and the coated plastisol is set or gelled by subjecting it to a current of hot air. The coated sheet is then passed, coating uppermost, at 2 meters/minute, 18 cm below a gas radiant heater, emitting heat at 60 kwatts/m$^2$ onto the coating. Directly after the heater, the back of the needled web of Example 1 is applied to the heated backing sheet in a laminated nip produced between two 25 cm. diameter rolls, loaded to a pressure of 45 kg/cm of width. The product so produced is very satisfactory for use as a floorcovering.

FURTHER DESCRIPTION OF INVENTION

One of the major disadvantages associated with asbestos-felt backings, which are now generally used for embossed cushioned floorcoverings, is that the plasticiser in the foamable and wearlayer compositions used in the surface layers of the floorcovering, tends to migrate On migration it comes into contact with the latex binder which is used to impregnate the asbestos fibre felt backing and an undesirable reaction, leading to a decrease in stability of the laminated material, is caused.

Migration also means that the product has a variable plasticiser content throughout its thickness and this is inherently undesirable, and leads to varying degrees of flexibility in the product and loss of dimensional stability, which results in the edges of the material curling and/or the whole material changing dimensions.

This lack of dimensional stability is particularly noticeable when laminates comprising such backings are used in tile rather than sheet form. It is essential that tiles should be of regular measurements and of high dimensional stability since otherwise they cannot be accurately matched up and holes may be left between adjacent tiles. It would be very desirable to produce a suitable backing for such coverings which have the necessary dimensional stability and which are yet cheap to produce.

It is of course desirable that the substrates for use with embossed cushioned floorcoverings are smooth, so that surface imperfections are not observable in the resulting laminate, and also so that there is no tendency towards delamination. Asbestos felt substrates are generally sufficiently smooth but they have an undesirable tendency to curl when a foamable composition is applied to one surface. This tendency can be counterbalanced by applying a PVC layer to the other side of the substrate, but this is an expensive operation. The substrates of the present invention have no tendency to curl but it is often desirable to apply a smoothing layer in the manner of Example 4. We have now found that particularly acceptable smoothness is achieved when additional polymeric material is incorporated in the softened mass before the substrate sheet is formed.

We find that the inclusion of quite small amounts of additional polymeric material allows the production of a sheet which can be formed, for example using calender rolls, with extremely satisfactory surface smoothness but without the disadvantage of curl during use. We find that there are no problems of binder migration as with asbestos-based backings and therefore the dimensional stability of the products of this type is good. Accordingly they are particularly suitable for use in tile form.

Whether a smoothing layer is applied, or additional polymeric material is used through its incorporation in the softened mass, generally no more than 30% and preferably no more than 25% by weight, based on the weight of the reject material, of polymeric material is added to the reject material. Usually the amount is 5 to 25% and often 10 to 20%, e.g. 15% by weight. The additional polymeric material generally comprises PVC or other vinyl polymers and plasticisers.

To increase the stability of the substrate it may be desirable to include in the mixture at this stage a small amount of a reinforcing material such as glass, cellulose or polyester fibres. The amount added is usually from 5 to 20% and preferably from 7 to 15% for example 10% by weight, based on the weight of the reject material. Alternatively, the sheet, when formed, may be laminated to a stablilishing scrim such as a non-woven glass fibre tissue or glass/synthetic or natural fibre tissue. The stabilising scrim may be adhered to one surface of the reconstituted sheet, or sandwiched between two such sheets. Suitable scrims are described in U.S. patent application Ser. No. 686,435, filed May 14, 1976 in the name of Robert Brown.

The polymeric material that is added can be any of the materials conventionally used for impregnating floor covering substrates and/or forming a smoothing layer thereon, and is suitably a vinyl polymer, e.g. polyvinyl chloride.

Accordingly, in one embodiment of the present invention, a mixture of the reject material, any reinforcing fibres, and the additional polymeric material is softened and formed into a sheet. This may be done in any convenient manner, for example by extrusion, but calender rolls are preferably used as well as or instead of the extrusion in order to form the substrate with a desirably smooth surface. The sheet can now be used as substrate for an embossed cushioned vinyl surface layer. If the surface layer has been formed on, for example a release paper, the paper is removed and the surface layer is bonded to the substrate. This can be achieved by fusion and/or by the use of an adhesive, e.g. as described above. However, it is preferred for convenience that the invention should be carried out by forming the embossed cushioned vinyl layer on the substrate sheet. Any of the various processes for the manufacture of embossed cushioned floor coverings may be used and include those described above (see also those patent specifications mentioned above).

By way of example, a substrate sheet formed by the method described above has a foamable vinyl composition applied over the entire surface thereof, and then an ink which contains an inhibitor or accelerator for the foaming agent in the foamable layer is printed onto certain areas of the overall foamable layer. When the assembly is heated to decompose the blowing agent and thus cause the foamable layer to foam, the areas which have been printed with, say, an inhibitor will foam to a lesser degree than those which have not been printed with the ink. In this way an embossed floor or heavy wall covering can be made and which has good dimensional stability. As a result, when the product is cut into tiles the latter are found to be particularly satisfactory.

The following Examples are a further illustration of the present invention.

EXAMPLE 5

By analogy with Example 4, previously rejected cushioned vinyl floor covering and/or scrap material can be reconstituted into a form suitable for use as a backing for opaque decorative surface layers, by mixing the roughly chopped material in a high temperature, high shear, temperature-controlled, mixing extruder, and then by milling the hot extruded composition and forming it into a sheet at 150° C. on a two-roll mill.

If, after milling, the softened composition is removed from the mill as a rough sheet and passed through a three-roll calender, the gauge consistency and surface finish is improved. The calendered material is removed from the calender as a smooth-surfaced sheet, is cooled under controlled tension and wound into rolls for further processing. The sheet so produced has a gauge of 0.6 mm., and tensile strength, flexibility, dimensional stability and surface smoothness properties comparable to the asbestos felt substrates commonly used in the manufacture of cushioned vinyl floor coverings, and also comparable to the vinyl base sheet used in the manufacture of hard printed vinyl products.

The reconstituted sheet so formed can then be coated by reverse roll coater or other means with 0.23 mm. of a chemically foamable PVC plastisol such as any of the foamable compositions described in British Patent Specification No. 1,069,998. The coating is fused at 160° C., a temperature at which the coating can be gelled without decomposing the blowing agent, by passage through an air circulation oven.

The coated material is printed using solvent-based inks or plastisols, on a gravure printing press or rotary screen machine, some of the inks optionally containing an inhibiting agent for the foaming reaction (following the teaching of British Patent Specifications Nos. 1,069,998/9) if texture is required in the end product.

The printed material is then overcoated by reverse roll coater using a plastisol which cures to a hard transparent wear layer film, giving protection to the print layer in the finished product. After application of this plastisol, the material is passed through an air circulation oven at 200° C. to cure the coating and to cause foaming to occur. After leaving the hot air circulation oven, the material is cooled down before being rolled up.

The finished material made by this process may be used as sheet material (i.e. used in rolls) or may be cut into tiles. The material produced is of good (i.e. smooth)

surface appearance and physical properties and exhibited good dimensional stability and the ability to lay flat. In tile form especially, the material did not tend to exhibit curl along the edges of the tile as happens, for example, when asbestos felt substrates are used in tile production. When laid, the seams between each tile did not tend to open.

EXAMPLE 6

The process of Example 5 is repeated except that the following composition is added to the chopped material before mixing (the percentages are by weight based on the weight of chopped material):

1.7% Pigment — $TiO_2$
0.3% Lubricant — Barium Stearate
4.0% PVC — Vestolit 6867*
2.0% Plasticeser — Dioctyl phthalate
1.0% filler — ground limestone
1.0% Stabilizer
* Vestolit is a Trade Mark of Chemische-Werke Huls After extrusion, the hot composition is further mixed and worked on a two-roll mill. After milling the softened composition is removed from the mill as a rough sheet and passed through a three-roll calender to improve the gauge uniformity and surface finish. The calendered material is removed from the calender as a smooth surfaced sheet, is cooled under controlled tension and wound into rolls for further processing.

The sheet so produced has a lower tensile strength, higher flexibility and better surface smoothness and uniformity than that produced in Example 5, and can be processed as described in Example 5 to give cushioned vinyl floor coverings, especially tiles, of good lay flat properties and dimensional stability, especially with respect to seam-opening of the laid flooring.

EXAMPLE 7

Example 6 is repeated except that, after leaving the calender, the sheet is laminated to a stabilising scrim, e.g. a non-woven glass fibre tissue or glass/synthetic or natural fibre tissue. The stabilising scrim may be adhered to one surface of the reconstituted sheet, or sandwiched between two layers of the reconstituted sheet. Suitable scrims are described in U.S. patent application Ser. No. 686,435.

After lamination, the reconstituted, laminated material is coated with a chemically foamable plastisol as described in Example 5, the coating being applied to the sheet face which does not carry the laminated scrim. A cushioned vinyl product is made as described above which is even more dimensionally stable in sheet or tile form, especially when the finished product is exposed to extremes of temperature fluctuation and wide differences in humidity. The finished material is especially suitable for use as a tile product.

We claim:

1. Floor or wall covering comprising a decorative opaque surface layer bonded to a backing sheet consisting essentially of a sheeted mass of particles of a sheet material, said sheet material comprising a foamed layer of vinyl resin, pigmented decoration and a wear layer over the foamed layer, and reinforcement selected from reinforcing fibres in the foamed layer and fibrous support beneath the foamed layer.

2. Covering according to claim 1 in which the decorative opaque surface layer is a fibrous material.

3. Covering according to claim 1 in which the decorative opaque surface layer is a needled fibrous material.

4. Covering according to claim 1 in which the decorative opaque surface layer is a layer of decorative pigmented vinyl material.

5. Covering according to claim 4 in the form of tiles.

6. Covering according to claim 4 in which the layer of vinyl material comprises an embossed foamed vinyl layer carrying a pigmented decoration.

7. Covering according to claim 1 in which there is a smoothing coat of polymeric material between the sheeted mass and the opaque surface layer.

8. Covering according to claim 1 in which the sheeted mass includes also 5 to 30% by weight additional polymeric material.

9. A covering according to claim 1 in the form of tiles comprising an embossed foamed vinyl surface layer covering carrying a pigmented decoration bonded to a backing sheet that consists essentially of a sheeted mass of communited particles of a sheet material and 5 to 30% by weight additional polymeric material, the said sheet material comprising a foamed layer of vinyl resin, pigmented decoration and a wear layer over the foamed layer, and reinforcement selected from reinforcing fibres in the foamed layer and a fibrous support beneath the foamed layer.

* * * * *